June 7, 1932.  H. A. KNOX ET AL  1,861,866

SUSPENSION FOR TRACKLAYING VEHICLES

Filed March 1, 1930   3 Sheets-Sheet 1

INVENTORS
Harry A. Knox
Bert F. Baker
BY W.M. Roach.
ATTORNEY

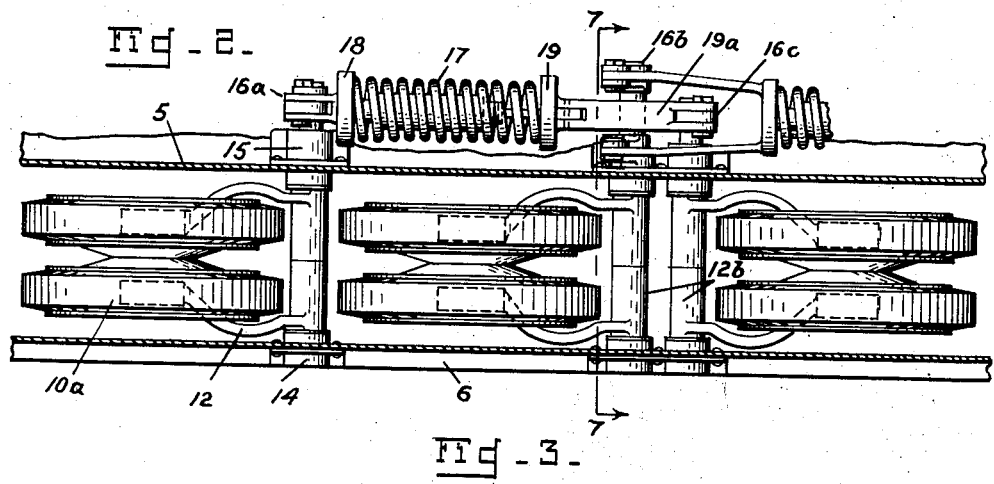
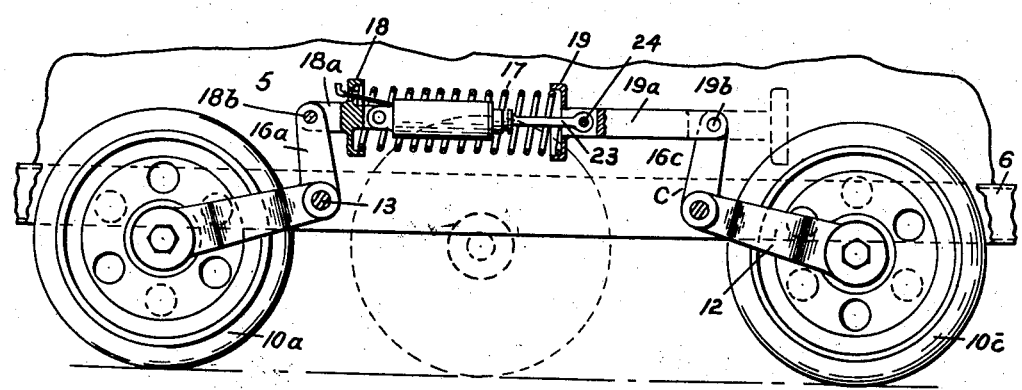
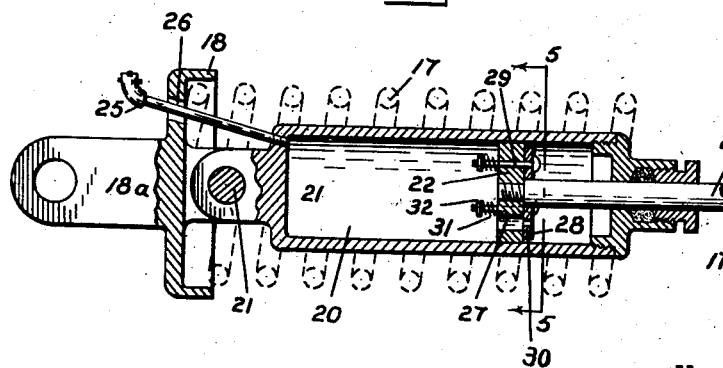
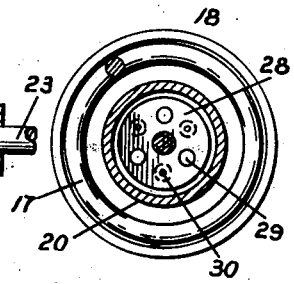

June 7, 1932.  H. A. KNOX ET AL  1,861,866
SUSPENSION FOR TRACKLAYING VEHICLES
Filed March 1, 1930   3 Sheets-Sheet 3

INVENTORS
Harry A. Knox
BY Bert F. Baker
W. N. Roach
ATTORNEY

Patented June 7, 1932

1,861,866

UNITED STATES PATENT OFFICE

HARRY A. KNOX AND BERT F. BAKER, OF DAVENPORT, IOWA

SUSPENSION FOR TRACKLAYING VEHICLES

Application filed March 1, 1930. Serial No. 432,453.

(GRANTED UNDER THE ACT OF MARCH 3, 1883, AS AMENDED APRIL 30, 1928; 370 O. G. 757)

The invention described herein may be manufactured and used by or for the Government for governmental purpose, without the payment to us of any royalty thereon.

The subject of this invention is a suspension for track-laying vehicles.

In meeting the demand for military track-laying vehicles capable of as high a speed as thirty-five miles per hour, the most difficult problem that is presented resides in the provision of a suspension that will insure sufficiently smooth riding to enable the vehicle to be employed as a stable gun platform while in motion and, further, that will uniformly distribute and automatically equalize the load through all of the track wheels and thereby secure effective tractive action over the entire ground reach of the track, regardless of the irregularities or inclination of the terrain.

With this purpose in view, the suspension of the present invention is directed to a novel arrangement of supporting levers fulcrumed on the body but adapted to yieldingly support the body when associated in groups through a resilient connection. The establishment of the independent groups between alternate wheels so that one wheel of each group is positioned in front of and one in rear of the longitudinal center of ground contact of the track insures a direct and undiminished transference of pressure to a remote wheel and thereby provides a compensating means that will act oppositely and equally in an effective manner.

The suspension is further characterized by a novel mounting of the horizontal resilient connections within the body of the vehicle and by the specific arrangement of the resilient connections whereby they enclose and their action in rebound is neutralized by a fluid shock absorbing mechanism.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 2 is a fragmentary plan view of the suspension, parts in section;

Fig. 3 is a fragmentary view in side elevation of the same, parts in section;

Fig. 4 is a detail view in longitudinal section of the resilient element;

Fig. 5 is a sectional view, taken on the line 5—5 of Fig. 4;

Figure 1:
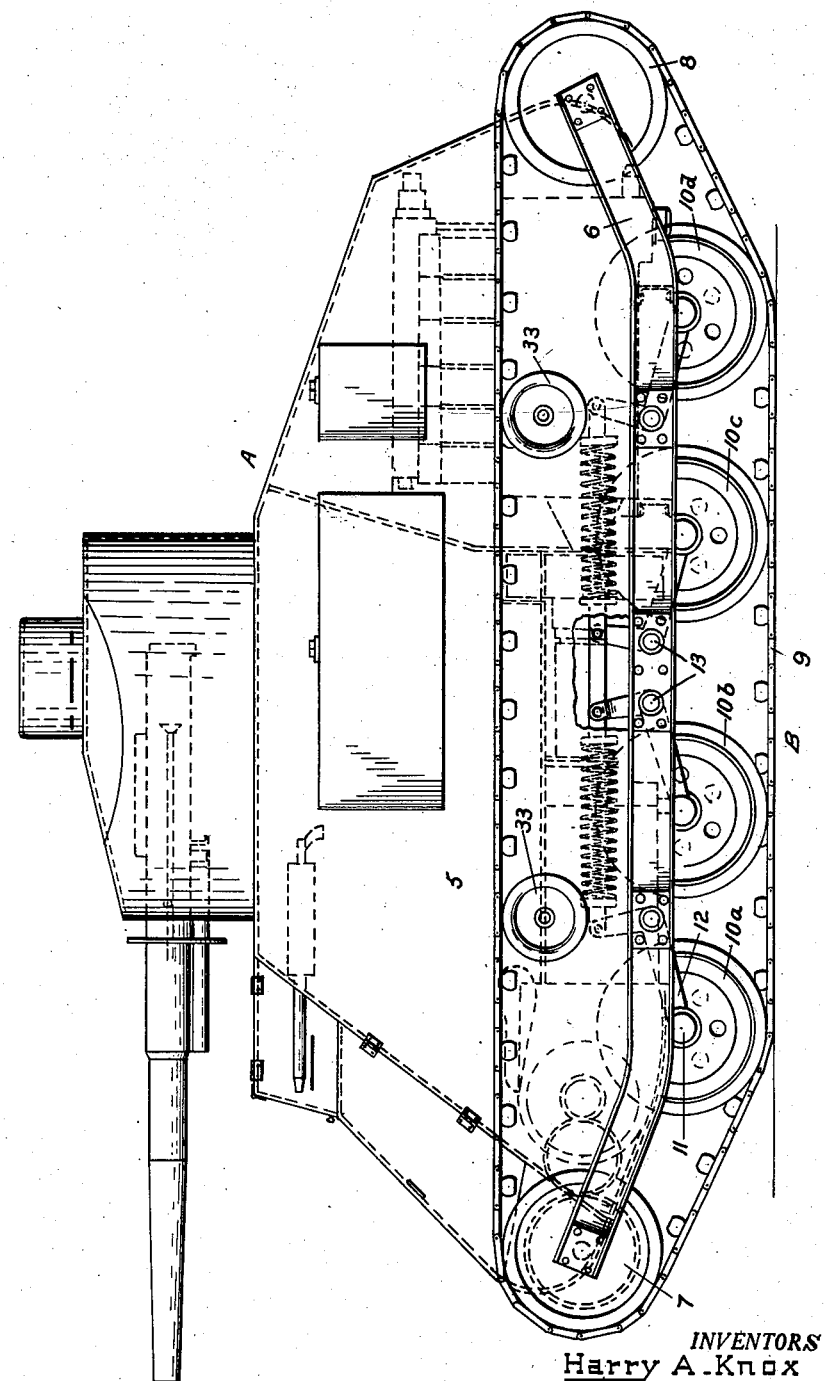
Fig. 1 is a view in side elevation of a vehicle equipped with the suspension, parts broken away.

Referring to the drawings by characters of reference:

There is shown a vehicle comprising a body A positioned between and carried by identical track-laying units B.

The frame for each track-lying unit is constituted by the side plate 5 of the body and by a rail 6 paralleling and spaced from the lower edge of the side plate. At the forward end of the frame is mounted a sprocket wheel 7 and at the rear end an idler wheel 8. Both of these wheels are raised above the ground and serve to carry an endless belt or track 9.

The body A is to be supported on a plurality of wheels 10 running on the inner tread of the track 9. The wheels 10 are preferably four in number and are of relatively large diameter to provide ample ground clearance for the body. As seen in side elevation in Fig. 3 the connection between the axle 11 of each wheel and the body is had by means of the long arm 12 of a bell crank lever C. The long arm 12 is forked to embrace the wheel and is more conveniently formed in two parts 12a—12a (Fig. 7) each having an inturned bearing 12b which is fast on a shaft 13 forming the fulcrum of the bell crank C. The fulcrum is journalled in a bearing 14 fixed in the rail and in a bearing 15 fixed in the side plate, the inner extremity 13a extending beyond the bearing 15 and consequently positioned some distance within the side plate of the body.

The short arm 16 of the bell crank lever is fast on the inner extremity 13a and is, of course, offset with respect to the long arm 12.

The bell cranks of the first and second wheels 10a and 10b extend rearwardly while those of the third and fourth wheels 10c and 10d extend forwardly. The longitudinal center of ground contact of the track is intermediate the two inner wheels 10b and 10c, and the most favorable operation is to be expected when the center of gravity of the entire vehicle is substantially in the plane of the center of ground contact, any preference to be in favor of a position forwardly thereof.

The actual suspension of the body A is effected by means of resilient connections mounted between the alternate, oppositely disposed arms 16 of the bell crank levers C, the wheels 10a and 10c forming one group and the wheels 10b and 10d forming another group.

Referring to Figs. 3 and 4, the resilient connection of each group comprises a horizontally disposed helical spring 17 confined for example between the arms 16a and 16c of the bell cranks for that particular group. More specifically, the spring is confined between seats 18 and 19 which, for convenience of mounting are formed respectively on a short link 18a and on a long link 19a. In the front group a short link 18a is connected to the foremost arm 16a by a pin 18b and the long link 19a is similarly connected to the rear arm 16c by a pin 19b.

Figure 7:
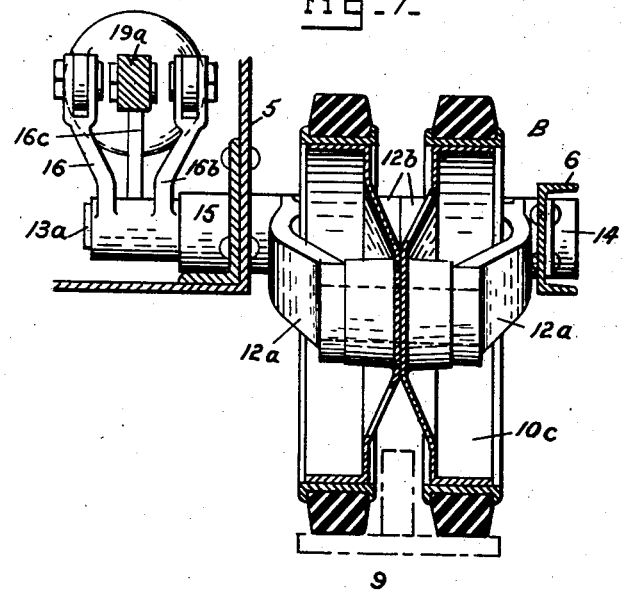
Fig. 7 is a sectional view on the line 7—7 of Fig. 2.

The arrangement of bell cranks for the group 10b–10d is similar although reversed to that described for the front group. Because of the overlapping of the two groups the upper arm 16b of the bell crank for the wheel 10b is bifurcated (Fig. 7).

Within the spring 17 is a guide in the form of a fluid shock absorbing mechanism associated with the upper short arms 16 of the bell cranks and effective to neutralize rebound of the spring. This mechanism is comprised by a closed cylinder 20 pivotally attached through a pin 21 to the seat 18 and a piston 22 working in the cylinder and having the extremity of the piston rod 23 pivotally attached by means of a pin 24 to the link 19a.

A valve fitting 25 extending through an aperture 26 in the seat 18 is secured to the cylinder and provides for introduction of a fluid into the same.

The piston is provided with ports 27 and carries on its outer face a disk valve 28 mounted on headed guide pins 29 and having ports 30 in line with the ports 27. A spring 31 embracing the inner end of each pin and confined between a nut 32 on the pin and the piston normally urges the disk valve against the outer face of the piston.

Figure 6:
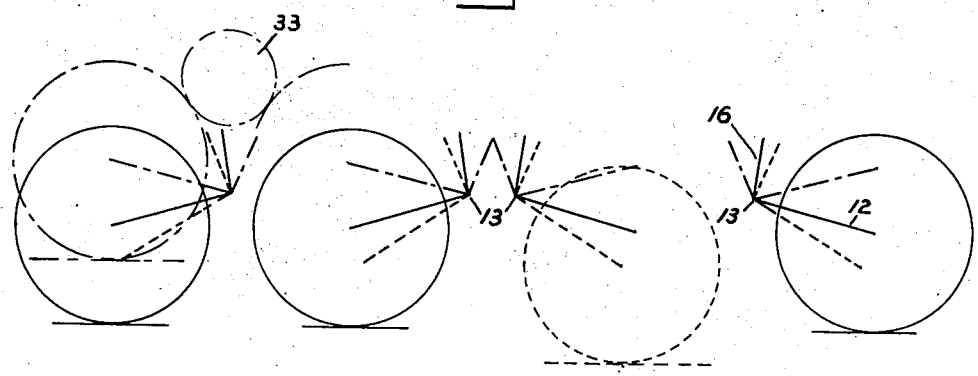
Fig. 6 is a schematic view, showing the position of the parts under varying conditions.

As shown diagrammatically in Fig. 6, the fulcrums 13 of the four bell cranks C are in line and the upper extremities of the short arms 16 of the bell cranks will remain substantially in line within the limits of their oscillation even though a considerable range of movement is provided for the wheels 10 through the long arms 12. The limit of upward movement of the wheel 10 with the corresponding position of the bell crank indicated in dotted and dash lines, and the limit of downward movement with the position of the bell crank indicated in dotted lines represents a range of movement that is sufficiently flexible to afford excellent ground contact of the track over highly irregular terrain. The mechanical structure defining the limits of oscillation of the bell cranks may conveniently be supplied by the idler wheels 33 (Figs. 1 and 6) supporting the upper reach of the track and also by the track itself which obviously controls the downward movement.

When the vehicle is resting on level ground the long arms 12 of the bell cranks all assume the same inclination with respect to the rail while the short arms are slightly off vertical in a direction towards their corresponding wheels to permit the upward stroke of the long arm to be in excess of the downward stroke while retaining the limits of oscillation of the short arm at points equi-distant from the vertical.

Upon encountering an obstruction or irregularity with a consequent raising or lowering movement of the particular supporting wheel the corresponding bell crank is rocked to directly and undiminishingly transmit the load or pressure to the complementary supporting unit of its group, which other unit bears on the opposite half of the track. The bell crank levers C act as compensating means to distribute the load equally over the track and insure a maximum traction under all conditions of operation. The spring 17 serving as the intermediary to transfer pressure also acts to absorb shocks in addition to supporting the load of the vehicle. Compression of the spring resulting from relative displacement of a short arm 16 with respect to its mate will cause the piston 22 to move further into the cylinder 20 and the fluid will unseat the disk valve to obtain unrestricted transference to the rear side of the piston. On restoration of the spring the fluid will be throttled through the ports 30 in the disk valve to cause damping of the springs and neutralize rebound.

While the principles embodied in the mounting of the suspension are illustrated and described as consisting of only two groups of two wheels each, it is to be understood that the invention is not limited thereby and that additional groups or additional wheels may be incorporated in a suspension as occasion may arise, or the length of the vehicle requires.

We claim:

1. A suspension for vehicles embodying a load member, a plurality of pairs of traction units on each side of the load member, the units of each pair positioned on opposite sides of the longitudinal center of ground contact, and in alternate relation to the units of another pair, levers fulcrumed on the load member and each carrying a traction unit, the levers of each pair of traction units being in horizontally reversed relation and a resilient connection between the levers of each pair of traction units.

2. A suspension for vehicles embodying a load member, a plurality of pairs of traction units on each side of the load member, the units of each pair positioned on opposite sides of the longitudinal center of ground contact, and in alternate relation to the units of another pair, levers fulcrumed intermediate their ends on the load member and the lower arm of each lever carrying a traction unit, a helical spring between the upper arms of the levers of each pair and cooperating elements of a fluid shock absorbing mechanism enclosed in the spring and associated with the upper arms.

3. A suspension for vehicles embodying a load member, a plurality of pairs of traction units on each side of the load member, the units of each pair positioned on opposite sides of the longitudinal center of ground contact and in alternate relation to the units of another pair, a lever connecting the load member and each traction unit, an offset arm fixed to the fulcrum of each lever and housed in the load member, and a resilient connection between the offset arms of the levers of each pair of traction units.

4. A vehicle embodying a load member, a track-laying unit on each side of the load member including an endless track, load supporting wheels running on the track, a swinging arm connecting each supporting wheel to the load member, and wheels for supporting the upper reach of the track, each positioned to be contacted by either of two adjacent supporting wheels to limit the upward movement thereof.

5. In a suspension for vehicles a load member, traction units, a bell crank lever connecting the load member and each traction unit, and a resilient connection between the upper arms of the bell crank levers of traction units on opposite sides of a traction unit whereby oscillations about such last mentioned traction unit will be damped.

6. In a suspension for vehicles, a load member, traction units, a lever connecting the load member and each traction unit, and a load transmitting connection between each two alternate levers on opposite sides of the longitudinal center of ground contact of the traction units.

HARRY A. KNOX.
BERT F. BAKER.